Patented Apr. 3, 1928.

1,665,193

UNITED STATES PATENT OFFICE.

HORACE D. STEVENS, OF AKRON, OHIO, ASSIGNOR TO THE FIRESTONE TIRE & RUBBER COMPANY, OF AKRON, OHIO, A CORPORATION OF OHIO.

TREAD-REMOVING MACHINE.

Application filed February 26, 1925. Serial No. 11,687.

This invention relates to machines for removing treads from tire carcasses and is especially adapted for use in repairing tires.

The purpose of the invention is to provide a machine for facilitating removing of the tough tread stock which tends strongly to adhere to the carcass of the tire and heretofore has been removed only with great difficulty and expenditure of much manual effort.

One object of the invention is to provide a pair of gripping rollers for receiving cut end of a tread strip which has been freed from the carcass, to provide means for driving at least one of said rollers to draw the strip therebetween, and to provide means for supporting the carcass permitting its rotation thereon as the strip is progressively drawn off the carcass.

Other objects will become apparent as the following description is read in connection with the accompanying drawings in which the invention is illustrated in its preferred form. It will be understood that the invention is not limited to the form thereof shown and described.

Figure 1:
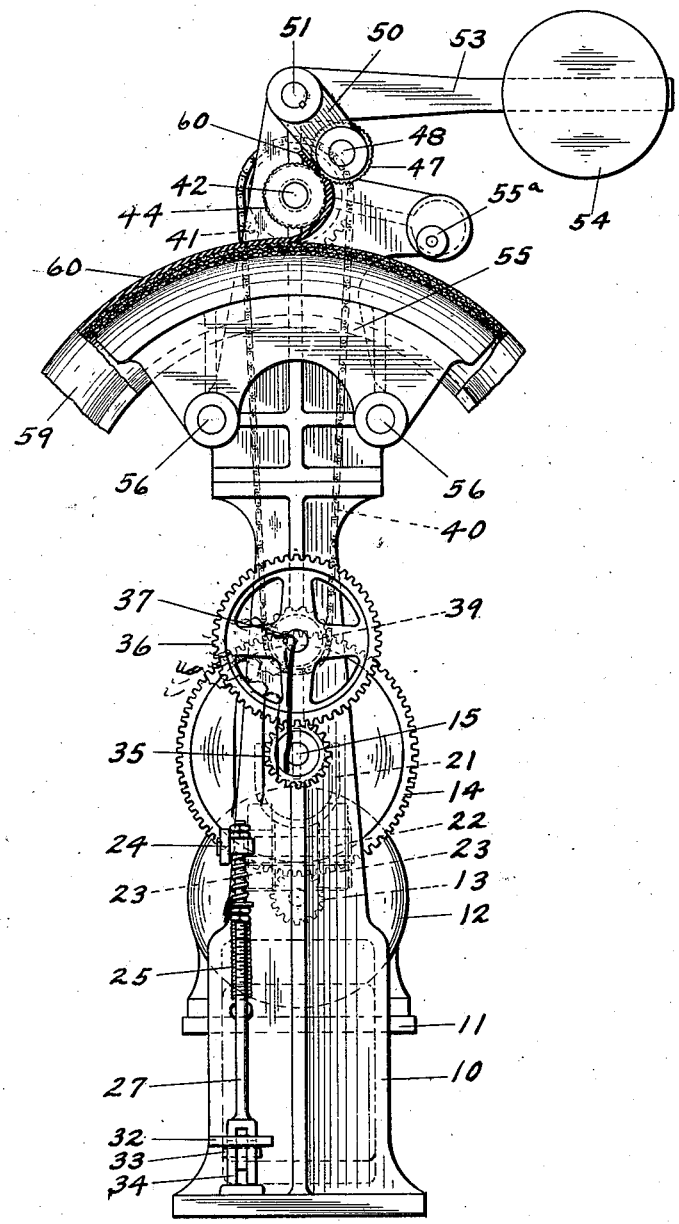
Figure 2:
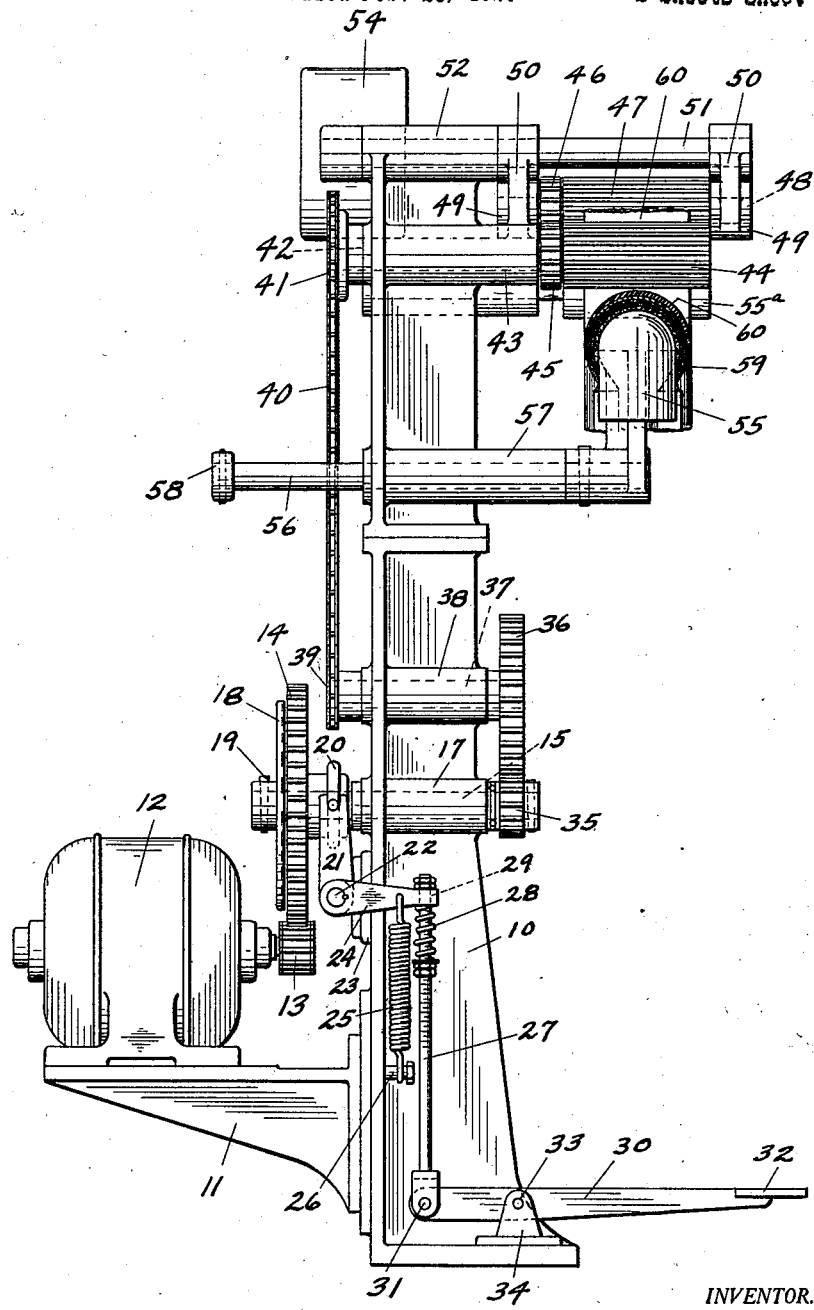

Of the accompanying drawings:

Figure 1 is a front elevation of a machine embodying the invention; and Figure 2 is a side elevation thereof.

Referring to the drawings, 10 is a suitable stand for the machine having a bracket 11 thereon which may have a motor 12 or other power means thereon. The motor 12 has a gear 13 on its rotor shaft meshed with a gear 14 shiftable on a shaft 15 journaled in a bearing 17 in standard 10. The gear 14 is arranged to be shifted into or away from engagement with a friction disk 18 secured onto said shaft as by a pin 19 the shifting action being accomplished by the usual collar 20 and yoke 21, the latter being secured on a rock shaft 22 journaled in bearings 23, 23 secured on standard 10. Rock shaft 22 is adapted to be actuated by a crank 24 secured thereon and having connected thereto a tensile spring 25 which is so connected to frame 10, as at 26, as to normally hold gear 14 away from disk 18 and thus unclutched on shaft 15.

For clutching gear 14 onto shaft 15 to drive the latter a link 27 is yieldingly connected by a compression spring 28 to crank 24, the link 27 being movable through an aperture 29 in the crank. A pedal lever 30 has one end connected as at 31 to the lower end of link 27, the other end 32 of the lever providing a pedal. The lever 30 is fulcrumed at 33 on a bracket 34 on the base of standard 10.

A pinion 35 is secured on shaft 16 so as to mesh with a gear 36 on a shaft 37 journaled in a bearing 38 in standard 10. Shaft 37 has a sprocket 39 thereon over which is trained a chain 40 arranged to drive a sprocket 41 secured on a shaft 42 journaled in a bearing 43 in standard 10. Arranged on shaft 42 is a tread-removing roller 44 driven by said shaft, said roller being corrugated, knurled, or roughened as indicated so as to grip the tread stock of a tire.

On shaft 42 there is also arranged a gear 45 adapted to mesh with a gear 46 secured with a knurled or roughened roller 47 on a shaft 48 which is journaled in bearings 49, 49 in arms 50, 50 secured on a rock shaft 51 in bearing 52 on standard 10. Roller 47 is thus movable into or out of engagement with roller 44 to grip or release a tread strip between the rollers. Rock shaft 51 is normally actuated so as to force the rollers 47 and 44 together by having an arm 53 thereon on which a counter weight 54 is adjustably secured.

There is provided for supporting a tire to be stripped of its tread, a segmental support 55 adapted to fit the interior of a tire carcass and to support a portion of the tread thereof below rollers 44 and 47. The support 55 is carried by a pair of rods 56, 56 slidable in bearings 57 in standard 10, the rods 56 being of such length as to permit the support 55 to be drawn forwardly of rollers 44 and 47 to permit mounting or removal of a carcass on the support 55. Collars 58 are provided to prevent accidently pulling the support 55 out of standard 10. To prevent accidental removal of the tire from support 55 during the tread removing operation, a roller 55ª is journaled onto standard 10 and is adapted to limit any such removal.

In use, motor 12 is continuously driven and a tire, a portion of which is indicated at 59, is mounted on support 55 the latter being drawn forwardly of rollers 44 and 47. The support 55 is then moved under the rollers 44 an 47 and a free portion of the tread strip, indicated at 60, is passed between rollers 44 and 47 which are driven for this purpose by depressing pedal 32. The tread strip may have been cut to provide a free portion prior to mounting onto support 55 or after mounting thereon and before moving under rollers 44 and 47. The support 55 may also be moved from under rollers 44 and 47 at any time for various hand operations.

After getting the free end of the tread 60 between the rollers 44 and 47, the latter may be continuously driven, this drawing the tread progressively off the tire which is permitted to rotate on its support 50, the operative meanwhile assisting in the tread removing operation by cutting the tread-stock away from the carcass with a hand-knife.

Modifications of the invention may be resorted to without departing from the spirit thereof or the scope of the appended claims. The machine of the invention is capable for use in removing fabric plies of the carcass as well as the tread.

What is claimed is—

1. Apparatus of the class described comprising a support for pneumatic tires, a pair of gripping rollers, said support and gripping rollers being relatively movable into or out of the same plane, means for yieldingly urging one of said rollers toward the other and means for driving both of said rollers.

2. Apparatus of the class described comprising a support for endless tires on which the tires may be circumferentially driven, and a pair of tread-removing gripping rollers said support and rollers being relatively movable into and out of the same plane.

3. Apparatus of the class described comprising means for supporting an endless tire and means for progressively removing a layer of material from said tire while on said support, said means including a pair of gripping rollers, driving mechanism for the rollers and means for yieldingly urging one roller toward the other.

HORACE D. STEVENS.